United States Patent
Jeong et al.

(10) Patent No.: US 11,927,756 B2
(45) Date of Patent: Mar. 12, 2024

(54) METHOD FOR PROVIDING AUGMENTED REALITY IMAGE AND HEAD MOUNTED DISPLAY DEVICE SUPPORTING THE SAME

(71) Applicant: Samsung Electronics Co., Ltd., Suwon-si (KR)

(72) Inventors: Eunsu Jeong, Suwon-si (KR); Ilgeun Bok, Suwon-si (KR); Chulsang Chang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 17/711,588

(22) Filed: Apr. 1, 2022

(65) Prior Publication Data
US 2022/0317453 A1 Oct. 6, 2022

Related U.S. Application Data

(63) Continuation of application No. PCT/KR2022/004574, filed on Mar. 31, 2022.

(30) Foreign Application Priority Data

Apr. 1, 2021 (KR) .................. 10-2021-0042875

(51) Int. Cl.
*G02B 27/01* (2006.01)
*G06T 11/00* (2006.01)
(Continued)

(52) U.S. Cl.
CPC .......... *G02B 27/0172* (2013.01); *G06T 11/00* (2013.01); *G09G 3/002* (2013.01);
(Continued)

(58) Field of Classification Search
CPC .......... G02B 27/0172; G02B 2027/014; G02B 2027/0178; G06T 11/00;
(Continued)

(56) References Cited

U.S. PATENT DOCUMENTS

| | | |
|---|---|---|
| 2012/0068913 A1 | 3/2012 | Bar-Zeev et al. |
| 2012/0154557 A1 | 6/2012 | Perez et al. |

(Continued)

FOREIGN PATENT DOCUMENTS

| | | |
|---|---|---|
| JP | 2010-139575 A | 6/2010 |
| KR | 10-2013-0130740 A | 12/2013 |

(Continued)

OTHER PUBLICATIONS

International Search Report dated Jun. 23, 2022, issued in International Application No. PCT/KR2022/004574.

*Primary Examiner* — Bryan Earles
(74) *Attorney, Agent, or Firm* — Jefferson IP Law, LLP

(57) ABSTRACT

A head-mounted display (HMD) device is provided. The HMD device includes a transparent member, a display, at least one sensor, and at least one processor functionally connected to the display and the at least one sensor. The at least one processor is configured to obtain information on a surrounding environment of the HMD device via the at least one sensor, set a focus space generated based on a designated location, determine at least one first object positioned inside the focus space and at least one second object positioned outside the focus space, based on the information on the surrounding environment and the focus space, and display, via the display, a virtual image in an area of the transparent member, wherein the at least one second object is seen in the area.

14 Claims, 11 Drawing Sheets

(51) Int. Cl.
*G09G 3/00* (2006.01)
*H04R 1/02* (2006.01)

(52) U.S. Cl.
CPC ....... *H04R 1/028* (2013.01); *G02B 2027/014* (2013.01); *G02B 2027/0178* (2013.01); *G06T 2207/20092* (2013.01); *G09G 2354/00* (2013.01); *H04R 2499/15* (2013.01)

(58) Field of Classification Search
CPC .......... G06T 2207/20092; G09G 3/002; G09G 2354/00; H04R 1/028; H04R 2499/15; G06F 3/147
See application file for complete search history.

(56) References Cited

U.S. PATENT DOCUMENTS

| | | | |
|---|---|---|---|
| 2014/0375683 A1* | 12/2014 | Salter | G06T 19/006 345/633 |
| 2015/0063661 A1 | 3/2015 | Lee et al. | |
| 2016/0292922 A1* | 10/2016 | Kasahara | G06F 3/017 |
| 2017/0358141 A1 | 12/2017 | Stafford et al. | |
| 2018/0095635 A1 | 4/2018 | Valdivia et al. | |
| 2018/0211448 A1 | 7/2018 | Bar-Zeev et al. | |
| 2019/0011979 A1 | 1/2019 | Faaborg et al. | |
| 2019/0279407 A1* | 9/2019 | McHugh | G06F 3/011 |
| 2019/0362560 A1* | 11/2019 | Choi | G06F 3/011 |
| 2020/0151959 A1 | 5/2020 | Nissinen et al. | |
| 2020/0258278 A1 | 8/2020 | Mirhosseini et al. | |
| 2020/0404159 A1* | 12/2020 | Lei | G06F 3/04845 |
| 2023/0141870 A1* | 5/2023 | Nomura | G02B 27/017 345/633 |

FOREIGN PATENT DOCUMENTS

| | | |
|---|---|---|
| KR | 10-2015-0026535 A | 3/2015 |
| KR | 10-2017-0100371 A | 9/2017 |
| KR | 10-1935061 B1 | 1/2019 |
| KR | 10-2019-0041293 A | 4/2019 |
| KR | 10-2019-0048241 A | 5/2019 |
| KR | 10-2019-0130397 A | 11/2019 |

\* cited by examiner

METHOD FOR PROVIDING AUGMENTED REALITY IMAGE AND HEAD MOUNTED DISPLAY DEVICE SUPPORTING THE SAME

CROSS-REFERENCE TO RELATED APPLICATION(S)

This application is a continuation application, claiming priority under § 365(c), of an International application No. PCT/KR2022/004574, filed on Mar. 31, 2022, which is based on and claims the benefit of a Korean patent application number 10-2021-0042875, filed on Apr. 1, 2021 in the Korean Intellectual Property Office, the disclosure of which is incorporated by reference herein in its entirety.

TECHNICAL FIELD

The disclosure relates to a method for providing an augmented reality image and a head-mounted display (HMD) device supporting the same.

BACKGROUND ART

Augmented reality (AR) refers to a technology for displaying a three-dimensional (or two-dimensional) virtual image superimposed on a real image or background such that they appear as a single image. The AR technology, which is a mixture of the actual environment and virtual objects, enables users to see the actual environment, thereby providing more realistic impressions and additional information.

In the case of a head mounted display (HMD) device based on the AR, an image provided through a projector may be directed onto an input grating surface through a prism. The user may then see with eyes the image that passes to the output grating surface. The user can observe images together with the actual environment and, for example, may identify information regarding an object in the currently observed environment.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

The user of an HMD device may use a device (for example, personal computer (PC), note book, or television) including a display to view contents (for example, electronic documents, images) or view printed materials (for example, books). When viewing contents or printed materials at a congested place, the user may have difficulty in concentrating on the contents or books.

Aspects of the disclosure are to address at least the above-mentioned problems and/or disadvantages and to provide at least the advantages described below. Accordingly, an aspect of the disclosure is to provide a method for providing an AR image and an HMD device supporting the same, wherein the inside (for example, a thing existing inside a configured space) of a configured space (for example, a space including an object that the user wants to concentrate on) is seen clearly, and the outside (for example, a thing existing outside the configured space) of the configured space is not seen clearly, thereby enabling the user who wears the HMD device to concentrate on the object existing in the configured space.

Technical problems to be solved by the disclosure are not limited to the above-mentioned technical problems, and other technical problems not mentioned herein will be clearly understood from the following description by those skilled in the art to which the disclosure pertains.

Additional aspects will be set forth in part in the description which follows and, in part, will be apparent from the description, or may be learned by practice of the presented embodiments.

Technical Solution

In accordance with an aspect of the disclosure, a head-mounted display (HMD) device is provided. The HMD device includes a transparent member, a display, at least one sensor, and at least one processor functionally connected to the display and the at least one sensor, wherein the at least one processor is configured to obtain information on a surrounding environment of the HMD device via the at least one sensor, set a focus space generated based on a designated location, based on the information on the surrounding environment and the focus space, determine at least one first object positioned inside the focus space, and at least one second object positioned outside the focus space, and display, via the display, a virtual image in an area of the transparent member, wherein the at least one second object is seen in the area.

In accordance with another aspect of the disclosure, a method for providing an augmented reality image by an HMD device is provided. The method includes obtaining information on a surrounding environment of the HMD device via at least one sensor of the HMD device, setting a focus space generated based on a designated location, based on the information on the surrounding environment and the focus space, determining at least one first object positioned inside the focus space, and at least one second object positioned outside the focus space, and displaying, via a display of the HMD device, a virtual image in an area of a transparent member, wherein the at least one second object is seen in the area.

Advantageous Effects

A method for providing an AR image and an HMD device supporting the same, according to various embodiments of the disclosure, are advantageous in that the inside (e.g., a thing existing inside a configured space) of a configured space (e.g., a space including an object that the user wants to concentrate on) is seen clearly, and the outside (e.g., a thing existing outside the configured space) of the configured space is not seen clearly, thereby enabling the user who wears the HMD device to concentrate on the object existing in the configured space.

A method for providing an AR image and an HMD device supporting the same, according to various embodiments of the disclosure, are advantageous in that a device (e.g., display device and/or audio device) included in the HMD device and/or an external electronic device are controlled such that the user can concentrate on an object (e.g., a device including a display, a book, or a virtual object).

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
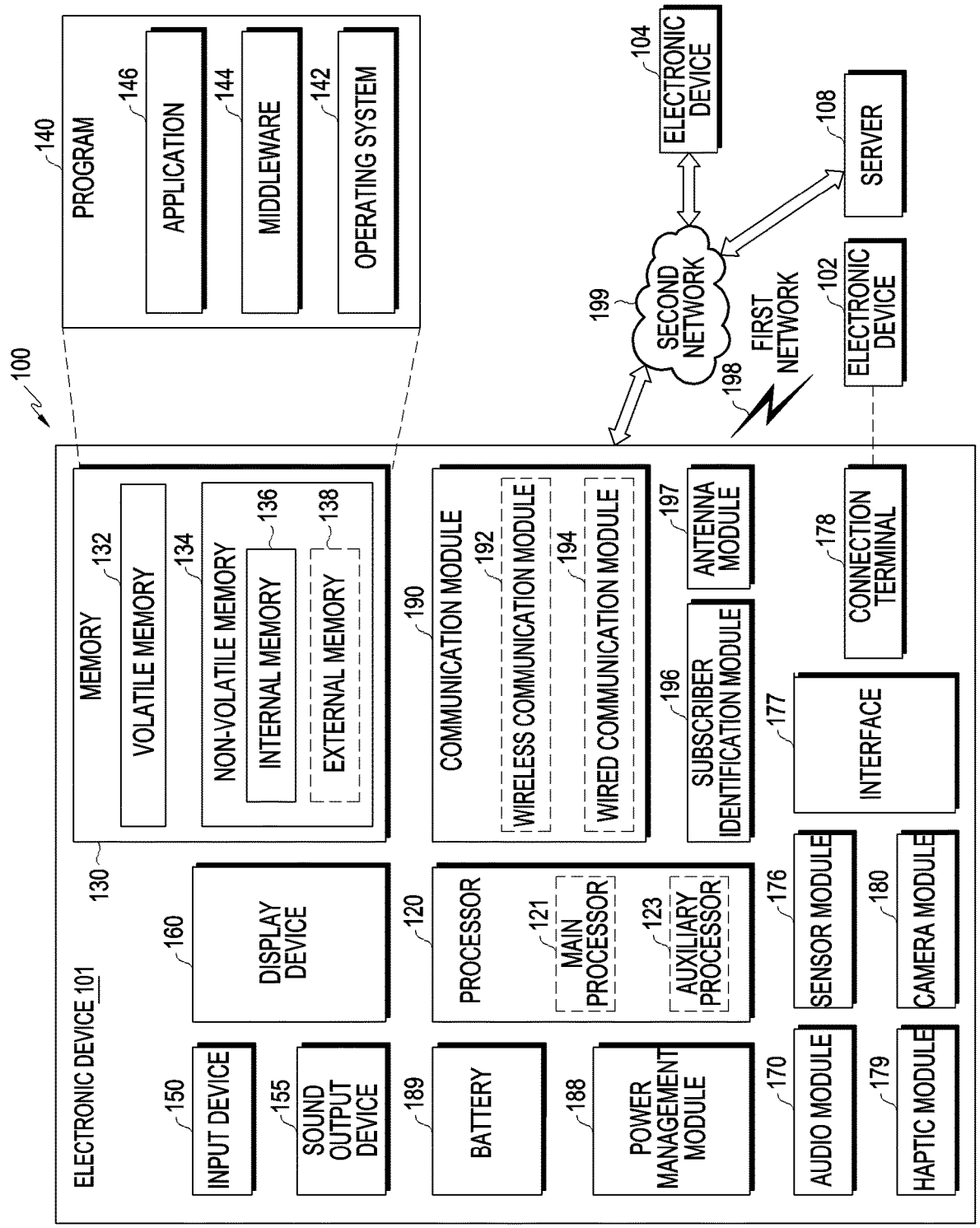
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may also be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
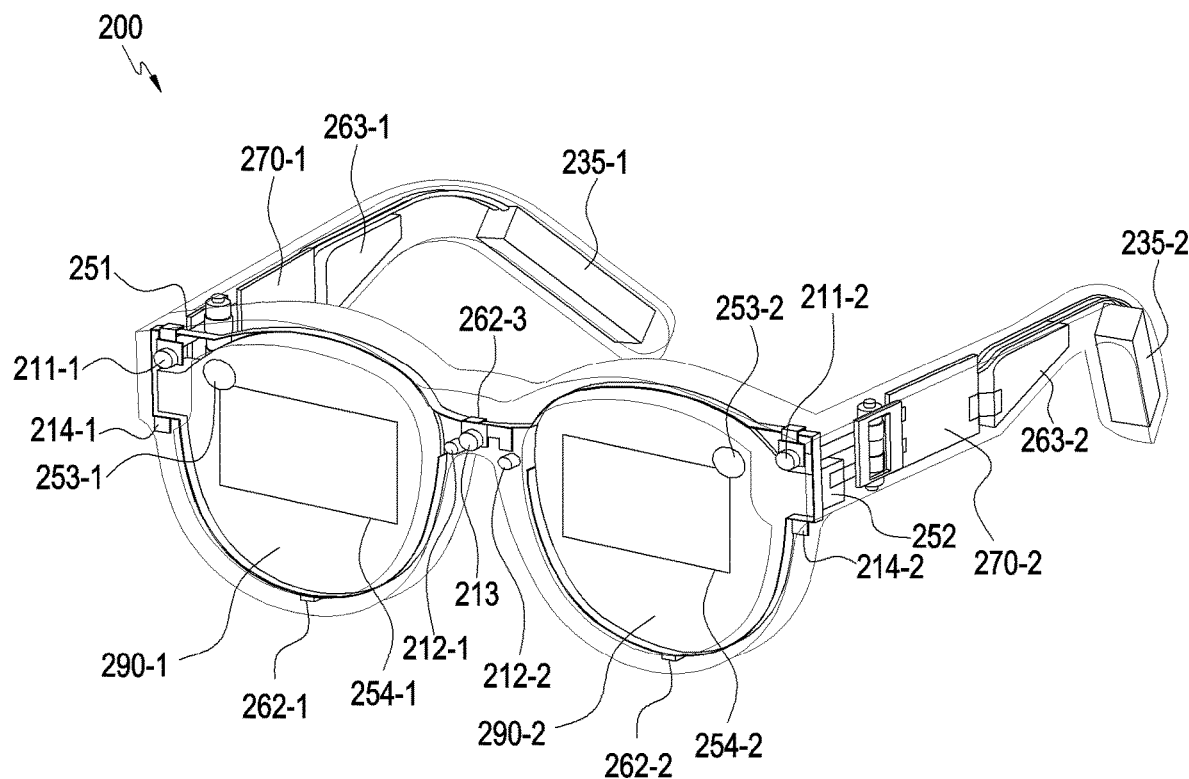
FIG. 2 is a diagram illustrating a structure of an HMD device according to an embodiment of the disclosure.

FIG. 2 is a diagram illustrating a structure of an HMD device 200 according to an embodiment of the disclosure.

Referring to FIG. 2, the HMD device 200 may include one or more first cameras 211-1 and 211-2, one or more second cameras 212-1 and 212-2, and one or more third cameras 213. An image obtained by the one or more first cameras 211-1 and 211-2 may be used for detecting a user's hand gesture, a user's head tracking, and/or space recognition. The one or more first cameras 211-1 and 211-2 may be global shutter (GS) cameras.

The one or more first cameras 211-1 and 211-2 may perform a simultaneous localization and mapping (SLAM) operation via depth imaging. The one or more first cameras 211-1 and 211-2 may perform space recognition for six degrees of freedom (6DoF).

An image obtained by the one or more second cameras 212-1 and 212-2 may be used to detect and track a user's pupil. The one or more second cameras 212-1 and 212-2 may be GS cameras. The one or more second cameras 212-1 and 212-2 may correspond to the left eye and the right eye, respectively, and the performances of the one or more second cameras 212-1 and 212-2 may be the same.

The one or more third cameras 213 may be high resolution cameras. The one or more third cameras 213 may perform an auto-focusing (AF) function and an image stabilizer function. The one or more third cameras 213 may be GS cameras or rolling shutter (RS) cameras.

The HMD device 200 may include one or more light emitting elements 214-1 and 214-2. The light emitting elements 214-1 and 214-2 are different from a light source, described later, which emits light to a screen output area of a display. The light emitting elements 214-1 and 214-2 may emit light to facilitate pupil detection when a user's pupil is detected and tracked via the one or more second cameras 212-1 and 212-2. Each of the light emitting elements 214-1 and 214-2 may include a light emitting diode (LED). The light emitting elements 214-1 and 214-2 may emit light within an infrared area. The light emitting elements 214-1 and 214-2 may be attached to the periphery of a frame of the HMD device 200. The light emitting elements 214-1 and 214-2 may be positioned around the one or more first cameras 211-1 and 211-2, and may assist gesture detection, head tracking, and space recognition performed by the one or more first cameras 211-1 and 211-2 when the HMD device 200 is used in a dark environment. The light emitting elements 214-1 and 214-2 may be positioned around the one or more third cameras 213, and may assist image acquisition performed by the one or more third camera 213 when the HMD device 200 is used in a dark environment.

The HMD device 200 may include batteries 235-1 and 235-2. The batteries 235-1 and 235-2 may store power for operating the remaining elements of the HMD device 200.

The HMD device 200 may include a first display 251, a second display 252, one or more input optical members 253-1 and 253-2, and/or one or more transparent members 290-1 and 290-2 including one or more screen display parts 254-1 and 254-2. The first display 251 and the second display 252 may include, for example, a liquid crystal display (LCD), a digital mirror device (DMD), a liquid crystal on silicon (LCoS), an organic light emitting diode (OLED), or a micro light emitting diode (micro LED). If each of the first display 251 and the second display 252 is configured by one of a liquid crystal display, a digital mirror device, or a liquid crystal on silicon, the HMD device 200 may include a light source that emits light to a screen output area of a corresponding display. On the other hand, if each of the first display 251 and the second display 252 is able to autonomously generate light, for example, is configured by one of an organic light emitting diode or a micro LED, the HMD device 200 may provide, to a user, a virtual image having a favorable quality without including a separate light source.

The one or more transparent members 290-1 and 290-2 may be arranged to face a user's eyes when the user puts on the HMD device 200. The one or more transparent members 290-1 and 290-2 may include at least one of a glass plate, a plastic plate, or a polymer. When a user puts on the HMD device 200, the user may see the outside world through the one or more transparent members 290-1 and 290-2. The one or more input optical members 253-1 and 253-2 may guide light generated by the first display 251 and the second display 252 to a user's eyes. Images based on the light generated by the first display 251 and the second display 252 are formed on the one or more screen display parts 254-1 and 254-2 on the one or more transparent members 290-1 and 290-2, and a user may see the images formed on the one or more screen display parts 254-1 and 254-2.

According to an embodiment of the disclosure, the HMD device 200 may include one or more optical waveguides (not illustrated). The optical waveguides may transfer light generated by the first display 251 and the second display 252 to a user's eyes. The HMD device 200 may include one optical waveguide corresponding to each of the left eye and the right eye. The optical waveguide may include at least one of glass, plastic, or polymer. The optical waveguide may include a nano pattern disposed on one inner or outer surface thereof, for example, a grating structure having a polygonal shape or a curved surface shape. The optical waveguide may include a free-form type prism; in this case, the optical waveguide may provide incident light to a user by means of a reflection mirror. The optical waveguide may include at least one of at least one diffraction element (e.g., a diffractive optical element (DOE) or a holographic optical element (HOE)) or reflection element (e.g., a reflection mirror), and may guide, to a user's eye, display light emitted from a light source by using the at least one diffraction element or reflection element included in the optical waveguide. According to various embodiments, the diffraction element may include an input/output optical member. According to an embodiment of the disclosure, the reflection element may include a member causing total reflection.

The HMD device 200 may include one or more voice input devices 262-1, 262-2, and 262-3 and one or more voice output devices 263-1 and 263-2.

The HMD device 200 may include a first PCB 270-1 and a second PCB 270-2. The first PCB 270-1 and the second PCB 270-2 may transfer electrical signals to at least some of the elements included in the HMD device 200. In an embodiment, the first PCB 270-1 and the second PCB 270-2 may be FPCBs. Each of the first PCB 270-1 and the second PCB 270-2 may include a first substrate, a second substrate, and an interposer disposed between the first substrate and the second substrate.

FIG. 2 illustrates an example of a see-through type HMD device, but the disclosure is not limited thereto, and a method for providing an augmented reality image, described later, may also be applied to a see-closed type HMD device in the same or similar way.

Figure 3:
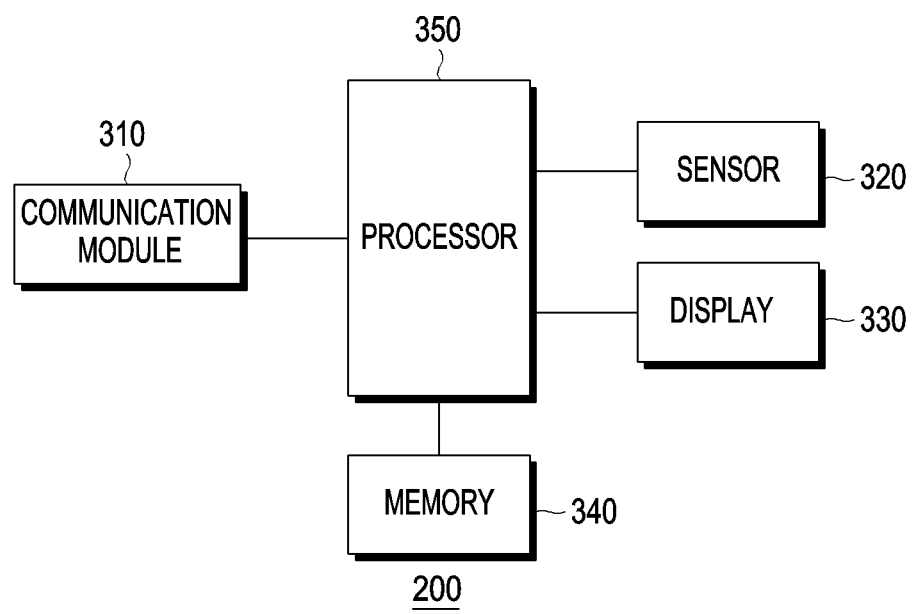
FIG. 3 is a block diagram of an HMD device according to an embodiment of the disclosure.

FIG. 3 is a block diagram of an HMD device according to an embodiment of the disclosure.

Referring to FIG. 3, the HMD device 200 may include a communication module 310, a sensor 320, a display 330, a memory 340, and/or a processor 350.

The configuration of the communication module 310 may be at least partially the same or similar to that of the communication module 190 illustrated in FIG. 1. The communication module 310 may perform communication with an external electronic device (e.g., the electronic device 102, the electronic device 104, or the server 108 in FIG. 1).

The communication module 310 may receive information for obtaining the location (e.g., three-dimensional coordinates of the HMD device 200) of the HMD device 200 from an external electronic device. For example, an ultra-wide-band (UWB) communication module included in the communication module 310 may receive, from an external electronic device, information which is used to obtain (e.g., calculate) three-dimensional coordinates (e.g., latitude, longitude, and altitude) of the HMD device 200 and relates to the location of the external electronic device, the distance between the external electronic device and the HMD device 200, and/or the direction between the external electronic device and the HMD device 200. The communication module 310 for receiving information for obtaining the location of the HMD device 200 is not limited to a UWB communication module. For example, the communication module 310 may include a short-range communication module (e.g., Bluetooth or WiFi) configured to receive, from an external electronic device, information for obtaining the location of the HMD device 200. The HMD device 200 may receive, from an external electronic device, information for obtaining the location of the HMD device 200 by recognizing a quick response (QR) code displayed on the external electronic device.

The communication module 310 may include a global navigation satellite system (GNSS) communication module (e.g., a global positioning system (GPS) communication module) so as to obtain the location of the HMD device 200.

The sensor 320 may include an element for obtaining information relating to a surrounding environment of the HMD device 200.

In an embodiment, the sensor 320 may include an element for obtaining information relating to the distances between the HMD device 200 and multiple objects (also referred to as "multiple things" or "multiple articles") (e.g., multiple objects positioned in at least a part of a space surrounding the HMD device 200) positioned in a surrounding environment (or this is also called a "surrounding space") of the HMD device 200. For example, the sensor 320 may include a depth vision time of flight (TOF) camera capable of calculating the distance between the HMD device 200 and an object, based on the phase difference between a time taken for light (e.g., infrared rays) emitted from a light emitting element, to return to a light receiving element after being reflected by an object, and a phase difference between the light emitted from the light emitting element and the light returning after being reflected by the object. As another example, the sensor 320 may include a Lidar TOF camera capable of calculating the distance between the HMD device 200 and an object by measuring a time taken for a pulse of light emitted from a light emitting element, to return to a light receiving element after being reflected by the object. As yet another example, the sensor 320 may include a stereo vision camera capable of calculating the distance between the HMD device 200 and an object by calculating a disparity between two-dimensional left/right images obtained by using two two-dimensional image sensors. As yet another example, the sensor 320 may include an image sensor capable of calculating the distance between the HMD device 200 and an object by projecting a structured pattern (e.g., a structured one set of patters) on the object by using a light emitting element, and capturing an image of the structured pattern which has been distorted by the object. The sensor for obtaining information relating to a surrounding environment of the HMD device 200 is not limited to the above examples.

The sensor 320 may include a camera (e.g., RGB camera) configured to recognize (e.g., detect and segment) multiple objects positioned in a surrounding space of the HMD device 200.

The sensor 320 may include an element for obtaining information relating to a posture and/or a movement of the HMD device 200. For example, the sensor 320 may include an acceleration sensor (e.g., 6-axis acceleration sensor) and/or a gyro sensor which is capable of obtaining information relating to the traveling of the HMD device 200, the rotation thereof, and/or a direction which the HMD faces.

The configuration of the display 330 may be at least partially the same or similar to that of the display module 160 illustrated in FIG. 1. The display 330 may also include the first display 251 and/or the second display 252.

The configuration of the memory 340 may be at least partially the same or similar to that of the memory 130 illustrated in FIG. 1. The memory 340 may store various information. Examples of the information that may be stored in the memory 340 are described below.

The configuration of the processor 350 may be at least partially the same or similar to that of the processor 120 illustrated in FIG. 1. The processor 350 may include one or more processors.

The processor 350 may control an overall operation of providing an augmented reality image. The operation of providing an augmented reality image by the processor 350 is described below with reference to FIG. 4.

FIG. 3 illustrates that the HMD device 200 includes the communication module 310, the sensor 320, the display 330, the memory 340, and/or the processor 350, but the disclosure is not limited thereto. According to an embodiment of the disclosure, the HMD device 200 may further include at least one element included in the electronic device 101 in FIG. 1 or the HMD device 200 in FIG. 2. The HMD device 200 may further include one or more transparent members 290-1 and 290-2 and audio devices (e.g., one or more voice input devices 262-1, 262-2, and 262-3 and one or more voice output devices 263-1 and 263-2). The processor 350 may provide an augmented reality image via the display 330, and the augmented reality image may be provided to a user through the one or more transparent members 290-1 and 290-2. For example, display parts 254-1 and 254-2 capable of providing an augmented reality image may be included in at least some or all of the one or more transparent members 290-1 and 290-2.

A head-mounted display (HMD) device according to various embodiments of the disclosure may include transparent members 290-1 and 290-2, a display 330, at least one sensor 320, and at least one processor 350 functionally connected to the display 330 and the at least one sensor, wherein the at least one processor 350 is configured to obtain information on a surrounding environment of the HMD device 200 via the at least one sensor 320, set a focus space generated based on a designated location, determine at least one first object positioned inside the focus space and at least one second object positioned outside the focus space, based on the information on the surrounding environment and the focus space, and display, via the display 330, a virtual image in an area of the transparent members 290-1 and 290-2, wherein the at least one second object is seen in the area.

In various embodiments, the designated location may include a location of the HMD device 200 or a location designated based on a user input.

In various embodiments, the at least one processor 350 may be configured to set the focus space generated within a designated distance from the designated location.

In various embodiments, the at least one processor 350 may be configured to set the focus space, based on a distance between the designated location and a location of a designated object, with respect to the designated location.

In various embodiments, the at least one processor 350 may be configured to enlarge or reduce the focus space, based on a designated input.

In various embodiments, the at least one processor 350 may be configured to, based on an input to select an object included in the surrounding environment, set the focus space including a location of the selected object.

In various embodiments, the at least one processor 350 may be configured to display, via the display 330, the virtual image having a size identical to a size of the area in the area of the transparent members 290-1 and 290-2 so that the at least one second object is seen to be opaque or blurred.

In various embodiments, the at least one processor 350 may be configured to, in a case where the focus space is configured based on a distance between the designated location and a location of a designated object, display, via the display 330, the virtual image in a remaining area remaining other than an area in which the designated object is seen on the transparent members 290-1 and 290-2.

In various embodiments, the at least one processor 350 may be configured to identify whether the information on the surrounding environment of the HMD device 200 is stored in a memory 340 of the HMD device 200, and when the information on the surrounding environment of the HMD device 200 is stored in the memory, obtain the information on the surrounding environment of the HMD device 200 from the memory 340.

In various embodiments, the HMD device may further include an audio device, wherein the at least one processor 350 is configured to, in a case where a focus function for displaying the virtual image is executed, control the audio device and/or an external electronic device such that the audio device and/or the external electronic device operates according to a setting related to the focus function.

Figure 4:
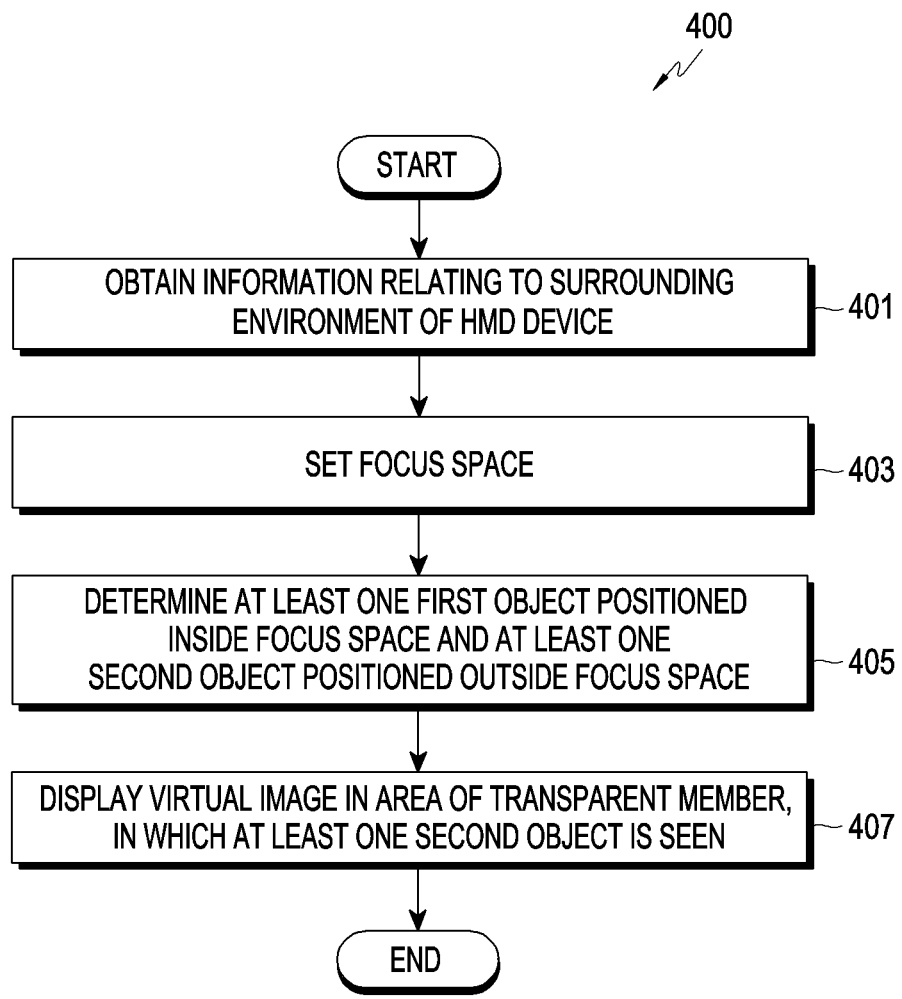
FIG. 4 is a flowchart illustrating a method for providing an augmented reality image according to an embodiment of the disclosure.

FIG. 4 is a flowchart 400 illustrating a method for providing an augmented reality image according to an embodiment of the disclosure.

Hereinafter, a function performed by the HMD device 200 throughout FIG. 4 to FIG. 11 is called a "focus function" (or a "focus mode"). For example, the focus function may be a function of enabling an inside part (e.g., an object positioned inside a set space) of the set space (e.g., a "focus space" described later) to be clearly seen, and enabling an outside part (e.g., an object positioned outside the set space) of the set space to be unclearly seen. A detailed description of the focus function will be described later.

Referring to FIG. 4, in operation 401, the processor 350 may obtain information relating to a surrounding environment (or this is also called a "surrounding space") of the HMD device 200 via the sensor 320.

The surrounding environment of the HMD device 200 may indicate a space, or a part of the space, surrounding the HMD device 200. For example, the surrounding environment of the HMD device 200 may be a space, or a part of the space, surrounding the HMD device 200, which can be seen by a user through the transparent members 290-1 and 290-2 of the HMD device 200. As another example, the surrounding environment of the HMD device 200 may be a space, or a part of the space, surrounding the HMD device 200, which is recognized via a camera (e.g., one or more first cameras 211-1 and 211-2) used for space recognition.

The processor 350 may obtain, via the sensor 320, information relating to multiple objects (e.g., multiple things or multiple articles) positioned in the surrounding environment (or included in the surrounding space) of the HMD device 200 (hereinafter, "multiple objects").

The processor 350 may obtain, via the sensor 320, information relating to the distances between the HMD device 200 and the multiple objects. For example, the processor 350 may obtain information relating to the distances between the HMD device 200 and the multiple objects via a camera (e.g., a depth vision TOF camera, a Lidar TOF camera, a stereo vision camera, and/or an image sensor using a structured pattern, described with reference to FIG. 2).

The processor 350 may obtain, via the sensor 320, information relating to the distances between the HMD device 200 and the multiple objects, and/or the colors of the multiple objects.

The processor 350 may three-dimensionally re-set the surrounding environment of the HMD device 200, based on the information relating to the distances between the HMD device 200 and the multiple objects (and/or the colors of the multiple objects). The processor 350 may obtain (e.g., generate) a depth map of the surrounding environment of the HMD device 200, based on the information relating to the distances between the HMD device 200 and the multiple objects (and/or the colors of the multiple objects). The operation of three-dimensionally reconfiguring, by the processor 350, the surrounding environment of the HMD, based on the information relating to the distances between the HMD device 200 and the multiple objects (and/or the colors of the multiple objects) may be called "spatial mapping".

The processor 350 may obtain the information relating to the surrounding environment of the HMD device 200, based on execution of the focus function.

The processor 350 may execute the focus function (e.g., enter the focus mode), based on a designated input.

The processor 350 may execute the focus function, when the HMD device 200 is worn by a user. For example, the processor 350 may detect that the HMD device 200 is worn by a user, via a proximity sensor, a touch sensor (or grip sensor), a sensor capable of tracking a user's gaze (e.g., a camera for eye tracking or a sensor capable of recognizing a user's iris), and/or an acceleration sensor (e.g., 6-axis acceleration sensor). The processor 350 may execute the focus function in response to detecting that the HMD device 200 is worn by a user.

The processor 350 may execute the focus function, based on a user input (e.g., a touch input on a touch pad, a user's hand gesture, a movement of the HMD device 200, a user's voice input, or execution of a designated application).

The processor 350 may execute the focus function when the location of the HMD device 200 corresponds to a designated location. The processor 350 may determine the location of the HMD device 200. For example, the processor 350 may determine the location of the HMD device 200 via a GNSS communication module (e.g., GPS communication module). As another example, the processor 350 may determine, via a UWB communication module, the location of the HMD device 200, based on information (e.g., the distance between the HMD device 200 and an external electronic device, or the direction between the HMD device 200 and the external electronic device) received from an external electronic device connected to the HMD device 200 by communication. As another example, the processor 350 may determine the location of the HMD device 200, based on information received from multiple external electronic devices connected to the HMD device 200 by communication. The processor 350 may receive, from three or more external electronic devices, information relating to the locations of the three or more external electronic devices via a short-range communication module. The processor 350 may calculate the distances between the HMD device 200 and the three or more external electronic devices by measuring the strengths of signals received from the three or more external electronic devices. The processor 350 may obtain (e.g., calculate) three-dimensional coordinates (e.g., latitude, longitude, and altitude) of the HMD device 200, based on the locations of the three or more external electronic devices, and the distances between the HMD device 200 and the three or more external electronic devices. The operation of obtaining, by the processor 350, the three-dimensional coordinates of the HMD device 200, based on the locations of the three or more external electronic devices and the distances between the HMD device 200 and the three or more external electronic devices may be an operation of determining the location of the HMD device 200 by using a triangulation method.

As yet another example, the processor 350 may determine the location of the HMD device 200 by combining the location of the HMD device 200, which is determined via a GNSS communication module (and/or UWB communication module), and/or the location of the HMD device 200, which is determined by using a triangulation method. The processor 350 may execute the focus function when the location of the HMD device corresponds to a location (e.g., a location designated to execute the focus function) stored in the memory 340 (or server). For example, the processor 350 may execute the focus function when the location of the HMD device is the same as the location stored in the memory 340, or is within a designated radius from the location stored in the memory 340.

An input for executing the focus function is not limited to the above examples. For example, the processor 350 may execute the focus function when a user's biometric information obtained via the sensor 320 (e.g., biometric sensor) corresponds to (e.g., matches) biometric information stored in the memory 340, and/or when user information (e.g., a password and/or a designated pattern) input by a user corresponds to user information stored in the memory 340.

The processor 350 may, when the focus function is executed, control an element (e.g., an audio device and/or a display device) included in the HMD device 200, and/or an external electronic device so as to allow a user to concentrate on a subject to be concentrated on. Examples of the operation of controlling, when the focus function is executed, an element included in the HMD device 200, and/or an external electronic device by the processor 350 will be described in detail with reference to FIG. 10.

In operation 403, the processor 350 may set a focus space generated based on a designated location.

The designated location serving as a criterion for setting the focus space (hereinafter, a "designated location") may be the location of the HMD device 200. For example, the processor 350 may set, as a designated location for setting the focus space, three-dimensional coordinates (e.g., latitude, longitude, and altitude) at which the HMD device 200 is currently positioned.

The designated location may be set based on a user input. For example, the processor 350 may set, as the designated location, a particular location (e.g., the location of a desk in an office), based on a user input. As another example, the processor 350 may select an external electronic device positioned around the HMD device 200, based on a user input. The processor 350 may set, as the designated location, the location of the selected external electronic device.

The focus space is a space surrounding the designated location, and may be a space (or a part of the space) generated based on the designated location (e.g., from the designated location). A method for setting the focus space by the processor 350 is described below with respect to FIG. 5.

Figure 5:
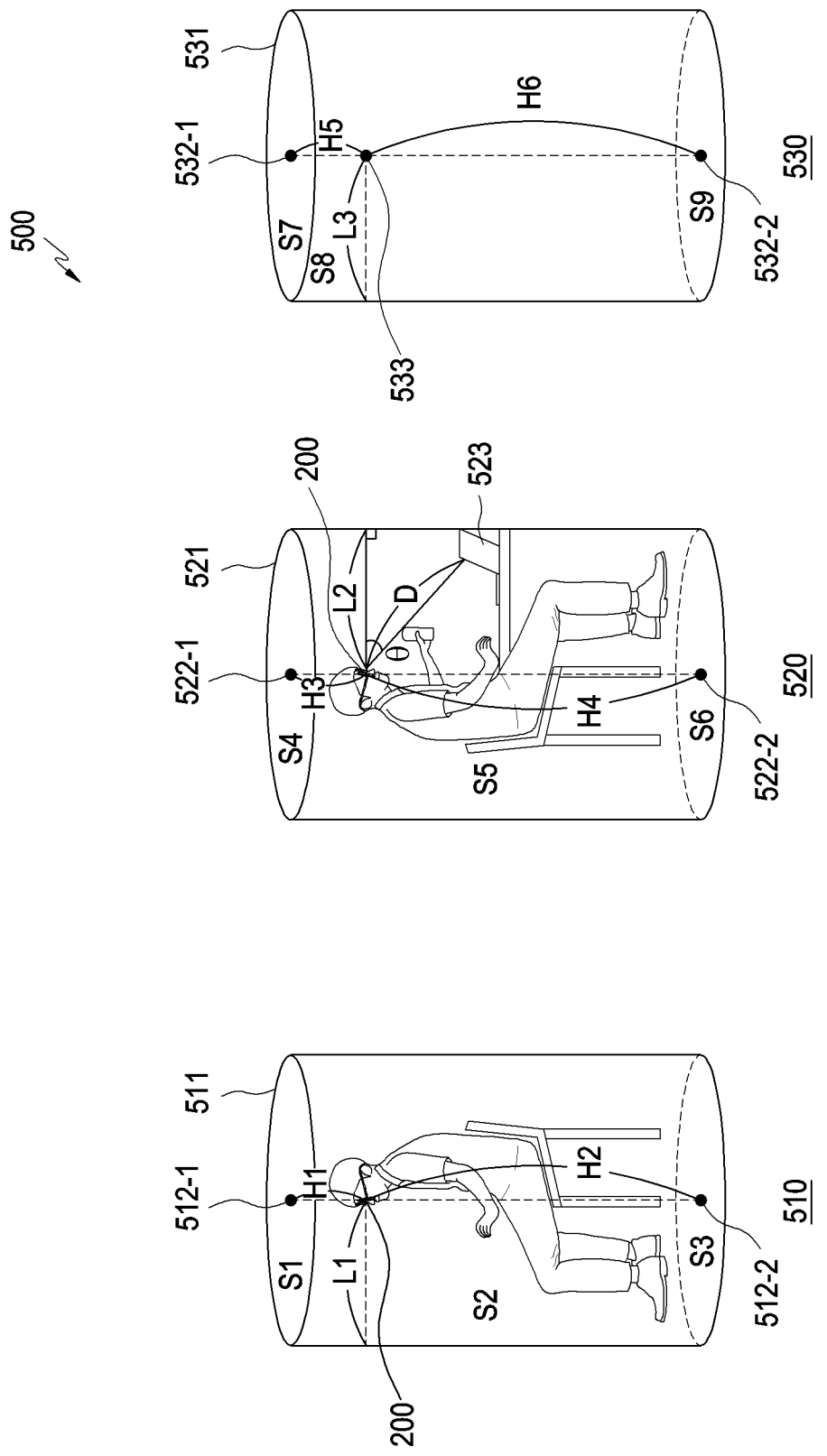
FIG. 5 is a diagram illustrating an example of a method for configuring a focus space according to an embodiment of the disclosure.

FIG. 5 is a diagram 500 illustrating an example of a method for setting a focus space according to an embodiment of the disclosure.

Referring to FIG. 5, the processor 350 may set a focus space 511 generated within a designated distance from the location of the HMD device 200, as in an illustration indicated by reference numeral 510. For example, the processor 350 may set the focus space 511 having a cylindrical shape including a side surface S2 set by locations spaced a designated distance L1 apart from the location of the HMD device 200 in the direction horizontal to the ground, and a top surface S1 and a bottom surface S3 set by locations spaced designated distances H1 and H2 apart from the location of the HMD device 200 in the direction vertical to the ground. Reference numerals 512-1 and 512-2 may be center points of the top surface S1 and the bottom surface S3, respectively.

The processor 350 may set a focus space, based on the distance between the HMD device 200 and a designated object (hereinafter, this is called a "designated object").

The processor 350 may recognize (e.g., detect and segment) multiple objects positioned in a surrounding space of the HMD device 200. For example, the processor 350 may obtain an image relating to multiple objects positioned in a surrounding space of the HMD device 200 via a camera (e.g., RGB camera). The processor 350 may recognize the multiple objects (e.g., the types of the multiple objects) from the image relating to the multiple objects by using a designated algorithm and/or artificial intelligence technique (e.g., a mask regions with convolutional neural network (MASK R-CNN), or you only look once (YOLO)). The operation of recognizing, by the processor 350, multiple objects positioned in a surrounding space of the HMD device 200 may be performed during operation 401. The processor 350 may select one object among the multiple objects, based on a user input. For example, the processor 350 may display multiple images indicating multiple objects on the transparent members 290-1 and 290-2 via the display 330. The processor 350 may designate, as an object for setting a focus space, an object corresponding to an image pointed by a user's gaze and/or a user gesture (e.g., a user's finger (e.g., a user's fingertip)) among the multiple images indicating the multiple objects. As another example, the processor 350 may designate, an object for setting a focus space, an object indicated by a voice (e.g., a voice indicating the type of an object) input from a user among the multiple objects. A method for designating, by the processor 350, an object to set a focus space is not limited to the above examples.

The processor 350 may set a focus space, based on the distance between a designated location (e.g., the location of the HMD device 200 or a location set by a user input) and the location of a designated object. In an embodiment, the processor 350 may determine the distance between the designated location and the designated object. For example, the processor 350 may determine the location of the designated object, based on information relating to the surrounding environment of the HMD device 200, which is obtained in operation 401. The processor 350 may determine the distance between the designated location and the designated object by identifying the distance between the HMD device 200 and the designated object among the distances between the HMD device 200 and the multiple objects included in the surrounding environment of the HMD device 200, which is the information relating to the surrounding environment of the HMD device 200. As another example, the processor 350 may determine the distance between the designated location and the location of the designated object, based on the designated location and the location of the designated object. The processor 350 may determine the current location of the HMD device 200 via a GNSS communication module (e.g., GPS communication module) (and/or UWB communication module) and/or by using a triangulation method, or may identify a designated location set by a user input. The processor 350 may receive information relating to the location of the designated object from the designated object via the communication module 310 when the designated object is an external electronic device connected to the HMD device 200 by communication. As another example, the processor 350 may determine the distance between the designated location and the location of the designated object, based on the designated location and the location of the designated object. A method for determining the distance between the designated location and the location of the designated object, based on the designated location and the location of the designated object is not limited to the above examples.

The processor 350 may set a focus space including a designated object (or the location of the designated object), based on the distance between a designated location (e.g., the location of the HMD device 200 or a location set by a user input) and the location of the designated object.

Reference numeral 520 may indicate a diagram of an example illustrating a method for setting a focus space, based on the distance between the HMD device 200 and the designated object. In the diagram indicated by reference numeral 520, a designated location serving as a criterion for setting a focus space may be the location of the HMD device 200. Referring to reference numeral 520, the processor 350 may determine a distance D between the HMD device 200 and a designated object 523 (e.g., a notebook) via a method described using the above examples. The processor 350 may determine an angle θ between a direction in which the HMD device 200 faces the designated object 523, and a direction horizontal to the ground via an acceleration sensor (e.g., 6-axis acceleration sensor). The processor 350 may determine a distance L2 (e.g., the distance between the location of the HMD device 200, and a side surface S5 of a cylinder corresponding to a focus space 521) for setting the focus space 521, based on the distance D between the HMD device 200 and the designated object 523 (e.g., a notebook), and the angle θ between a direction in which the HMD device 200 faces the designated object 523, and the direction horizontal to the ground. The processor 350 may determine the distance L2 for setting the focus space 521 so as to allow the designated object 523 to be included in the focus space. For example, the processor 350 may calculate a distance (D*cos θ), based on the distance D between the HMD device 200 and the designated object 523 (e.g., a notebook), and the angle θ between a direction in which the HMD device 200 faces the designated object 523, and the direction horizontal to the ground. The processor 350 may determine the distance L2 for setting the focus space 521 by adding an additional distance (a tolerance) to the distance (D*cos θ) so as to allow the designated object 523 to be included in the focus space. The processor 350 may set, based on the distance D between the HMD device 200 and the designated object 523, the focus space 521 having a cylindrical shape including the side surface S5 set by locations spaced by the distance L2, and a top surface S4 and a bottom surface S6 set by locations spaced designated distances H3 and H4 apart from the location of the HMD device 200 in the direction vertical to the ground. Reference numerals 522-1 and 522-2 may be center points of the top surface S4 and the bottom surface S6, respectively.

The processor 350 may set a focus space 531, based on a designated location 533 (e.g., a location set based on a user input), as in an illustration indicated by reference numeral 530. For example, the processor 350 may set the focus space 531 having a cylindrical shape including a side surface S8 set by locations spaced a designated distance L3 apart from the designated location 533 in the direction horizontal to the ground, and a top surface S7 and a bottom surface S9 set by locations spaced designated distances H5 and H6 apart from the designated location 533 in the direction vertical to the ground. Reference numerals 532-1 and 532-2 may be center points of the top surface S7 and the bottom surface S9, respectively.

Although not illustrated in FIG. 5, according to an embodiment of the disclosure, when the processor 350 generates a focus space, based on a designated location (e.g., a location set based on a user input), the processor may also set the focus space, based on the distance between the designated location (e.g., a location set by on a user input) and the location of a designated object. For example, the processor 350 may determine the distance between a designated location (e.g., a location set by on a user input) and the location of a designated object, based on the designated location (e.g., a location set based on a user input) and the location of the designated object. The processor 350 may set a focus space including the designated object (or the location of the designated object), based on the distance between the designated location (e.g., a location set by a user input) and the location of the designated object.

FIG. 5 illustrates an example in which the focus spaces 511, 521, and 531 are set to have a cylindrical shape, and the disclosure is not limited thereto. The focus space may be set in various three-dimensional shapes, and a shape in which the focus space is set will be described in detail with reference to FIG. 8.

The operation of setting, by the processor 350, a focus space generated based on a designated location may include an operation of determining, by the processor 350, the distances from the designated location to points (e.g., points setting a boundary surface dividing the inside and the outside of the focus space) of at least one boundary surface (e.g., the top surface, the side surface, and the bottom surface of a cylinder of FIG. 5) (a boundary surface dividing the inside and the outside of the focus space) setting the focus space. For example, when the designated location is the location of the HMD device 200, an operation of setting, by the processor 350, a spherical focus space within a designated distance from the location of the HMD device 200 may include an operation of determining the distances between the location of the HMD device 200 and points setting a surface (e.g., the surface of a sphere) of the spherical focus space. When the distances from the designated location to points of at least one boundary surface setting the focus space are determined, the processor 350 may include information relating to the determined distances in the memory 340.

In the above examples, the processor 350 sets a focus space to be omnidirectionally oriented from a designated location (e.g., to face all directions surrounding the location of the HMD device 200), but the disclosure is not limited thereto. According to an embodiment of the disclosure, the processor 350 may set, from a designated location, a focus space corresponding to a field of view (FOV) (e.g., an FOV of a camera (e.g., one or more first cameras 211-1 and 211-2 and/or one or more third cameras 213) of the HMD device 200) of the HMD device 200, and/or a user's view range. For example, the processor 350 may set, as a focus space, a space within an FOV (and/or a user's view range) of the HMD device 200 in the focus space 511 in the illustration indicated by reference numeral 510 in FIG. 5.

In an embodiment, the processor 350 may change the focus space, based on a designated input. For example, the processor 350 may enlarge and/or reduce the focus space, based on a designated input. Hereinafter, referring to FIGS. 6 and 7, a method for changing the focus space, based on a designated input by the processor 350 will be described in detail.

Figure 6:
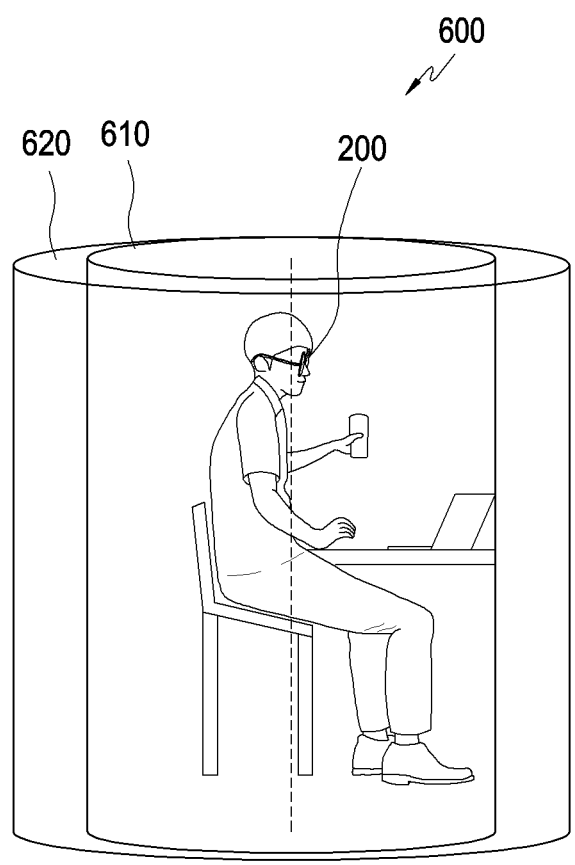
FIGS. 6 and 7 are diagrams illustrating an example of a method for changing a focus space according to various embodiments of the disclosure.
Figure 7:
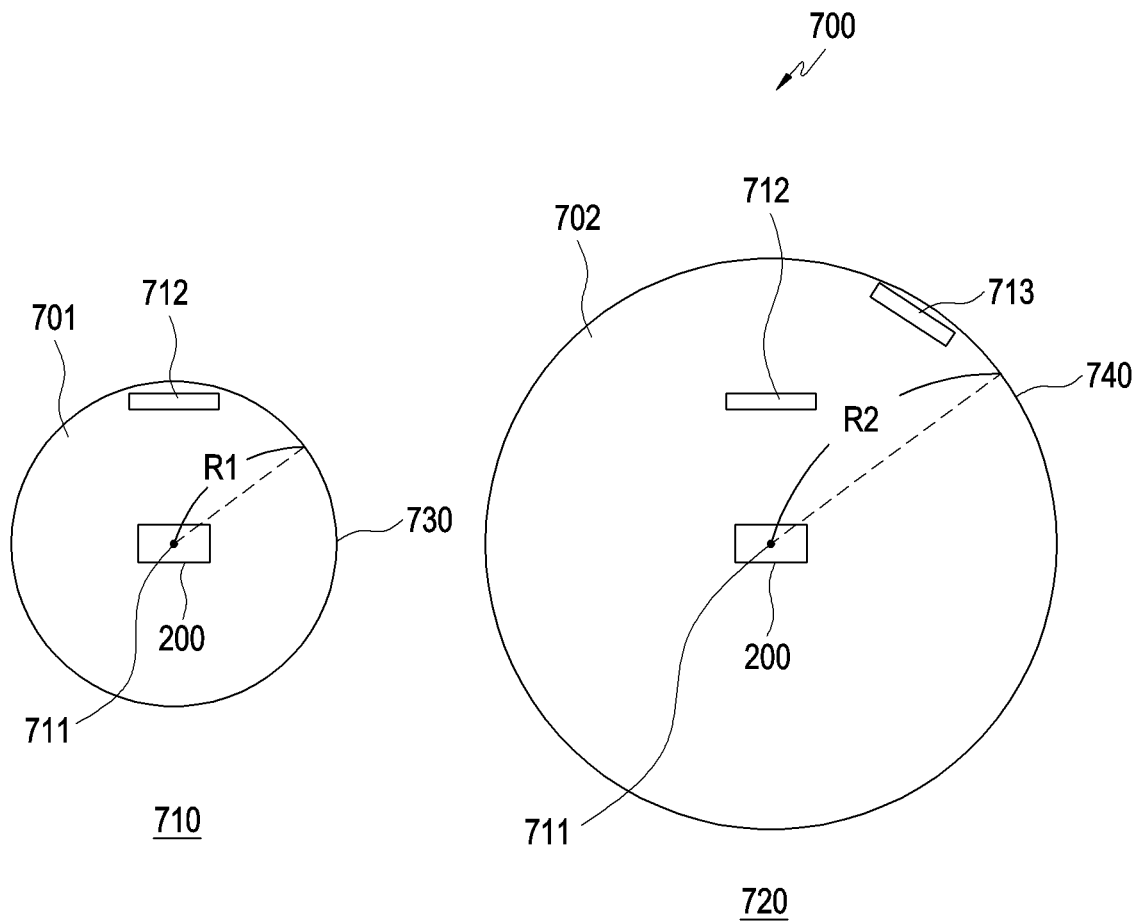

FIGS. 6 and 7 are diagrams 600 and 700 illustrating an example of a method for changing a focus space according to various embodiments of the disclosure.

Referring to FIGS. 6 and 7, the processor 350 may change a set focus space, based on a designated input.

The processor 350 may change the set focus space, based on a touch input (e.g., a touch input on a touch pad) on the HMD device 200, a user gesture (e.g., a user's finger (e.g., a user's fingertip)), and/or a user's gaze. As another example, the processor 350 may change the set space by selecting an object existing within a surrounding environment. As yet another example, the processor 350 may change the set focus space, based on a designated movement (e.g., a designated movement pattern) of the HMD device 200. As yet another example, the processor 350 may change the set focus space, based on a voice input. A method for changing the set focus space by the processor 350 is not limited to the above examples.

Referring to FIG. 6, the processor 350 may set a first focus space 610, and then enlarge the first focus space 610, based on a designated input, thereby setting a second focus space 620. The processor 350 may set the second focus space 620, based on a designated input, and then reduce the second focus space 620, based on a designated input, thereby setting the first focus space 610.

Referring to FIG. 7, reference numerals 710 and 720 of FIG. 7 may be top views (e.g., diagrams of the HMD device 200 viewed from above) of the HMD device 200.

As in an illustration indicated by reference numeral 710, the processor 350 may set a first focus space 701, based on the distance between the HMD device 200 and a designated object 712. For example, the processor 350 may set the first focus space 701 which is set by a boundary surface 730 (e.g., a surface dividing the inside and the outside of the first focus space 701) spaced a designated distance R1 apart from a location 711 of the HMD device 200, and includes a designated object 712 (e.g., the location of the designated object 712).

While the first focus space 701 is set, the processor 350 may additionally select an object 713 outside the boundary surface 730 with respect to the designated object 712, based on a user input. When the object 713 is additionally selected with respect to the designated object 712, the processor 350 may set a second focus space 702 including the designated object 712 and the selected object 713, based on the location 711 of the HMD device 200. For example, the processor 350 may set the second focus space 702 which is set by a boundary surface 740 (e.g., a surface dividing the inside and the outside of the second focus space 702) spaced a designated distance R2 apart from a location 711 of the HMD device 200, and includes the designated object 712 (e.g., the location of the designated object 712) and the selected object 713 (e.g., the location of the selected object 713). Reference numeral 720 indicates an example of a case where the object 713 is additionally selected with respect to the designated object 712, but the disclosure is not limited thereto. For example, the processor 350 may select an object (not illustrated) inside or outside the boundary surface in replacement of the designated object 712. The processor 350 may set the second focus space 702 including the selected object 713, based on the location 711 of the HMD device 200 without considering the designated object 712 (e.g., the location of the designated object 712). For example, the processor 350 may set a focus space, based on the distance between the HMD device 200 and the object 713 selected in replacement of the designated object 712 with respect to the location 711 of the HMD device 200.

FIG. 7 illustrates examples of changing the focus space, based on a designated input. However, according to an embodiment of the disclosure, the processor 350 may change a focus space according to a movement (e.g., the traveling and/or rotation of the HMD device 200) of the HMD device 200. For example, in a case where the HMD device 200 is moved, the processor 350 may set a focus space, based on the location of the moved HMD device 200. As another example, the processor 350 may, when the FOV of the HMD device 200 is changed according to rotation of the HMD device 200, set a focus space corresponding to the changed FOV.

The processor 350 may not change the focus space even when a movement of the HMD device 200 is detected. For example, in a case where the focus space is set based on a location set by a user, even when it is detected that the HMD device 200 has been moved, the processor 350 may maintain the pre-set focus space without changing the focus space.

The processor 350 may, when a movement of the HMD device 200 is detected, re-set the focus space, based on the distance between the HMD device 200 and the designated object 712 and/or the selected object 713. For example, the processor 350 may reduce the focus space when the distance between the HMD device 200 and the designated object 712 and/or the selected object 713 becomes short, or may enlarge the focus space when the distance between the HMD device 200 and the designated object 712 and/or the selected object 713 becomes long.

The processor 350 may set various shapes of focus spaces. A method for setting various shapes of focus spaces by the processor 350 is described below with reference to FIG. 8.

Figure 8:
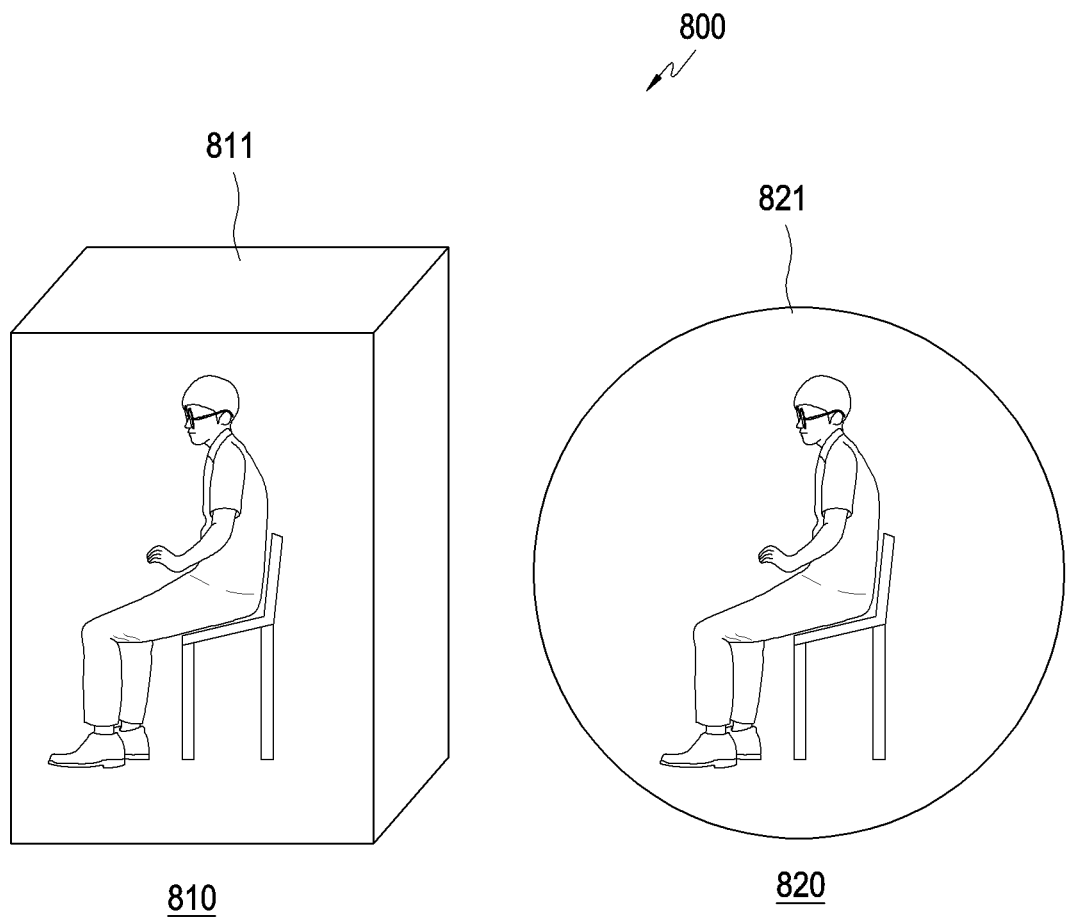
FIG. 8 is a diagram illustrating an example of various shapes of focus spaces according to an embodiment of the disclosure.

FIG. 8 is a diagram 800 illustrating an example of various shapes of focus spaces according to an embodiment of the disclosure.

Referring to FIG. 8, The processor 350 may set a cuboid focus space 811 or a spherical focus space 821 as in the illustration indicated by reference numeral 810, other than a cylindrical shape such as the focus spaces 511, 521, and 531 illustrated in FIG. 5 as examples. The shape of a focus space is not limited to a cylinder, a cuboid, or a sphere, and may include various three-dimensional shapes.

The processor 350 may select a shape setting the focus space, based on a designated input. For example, in a case where the focus space can be generated in the HMD device 200 in a cylindrical shape, a cuboid shape, or a spherical shape, the focus space may be set in a shape selected by a user among a cylindrical shape, a cuboid shape, or a spherical shape.

Returning to FIG. 4, in operation 405, the processor 350 may determine, based on the information relating to the surrounding environment and the focus space, at least one first object positioned inside the focus space (hereinafter, this is called "at least one first object"), and at least one second object positioned outside the focus space (hereinafter, this is called "at least one second object").

The processor 350 may determine at least one first object positioned inside the focus space, and at least one second object positioned outside the focus space, based on the distances between the locations of multiple objects included in the surrounding environment, and a designated location serving as a criterion for setting the focus space, and the distances between the designated location and the positions of points on at least one boundary surface setting the focus space. The processor 350 may determine at least one third object positioned on the at least one boundary surface setting the focus space (hereinafter referred to as "at least one third object"). The processor 350 may determine a part positioned inside the focus space and a part positioned outside the focus space with respect to the at least one third object.

The operation of determining, by the processor 350, at least one first object positioned inside the focus space, and at least one second object positioned outside the focus space among multiple objects included in the surrounding environment may include an operation of classifying, by the processor 350, the multiple objects included in the surrounding environment into at least one object positioned inside the focus space, and at least one object positioned outside the focus space (and at least one object positioned on at least one boundary surface setting the focus space).

In operation 407, the processor 350 may display, via the display 330, a virtual image in an area of the transparent members 290-1 and 290-2, in which the at least one second object is seen. Hereinafter, referring to FIG. 9, a method for displaying a virtual image in an area of the transparent members, in which the at least one second object is seen will be described in detail.

Figure 9:
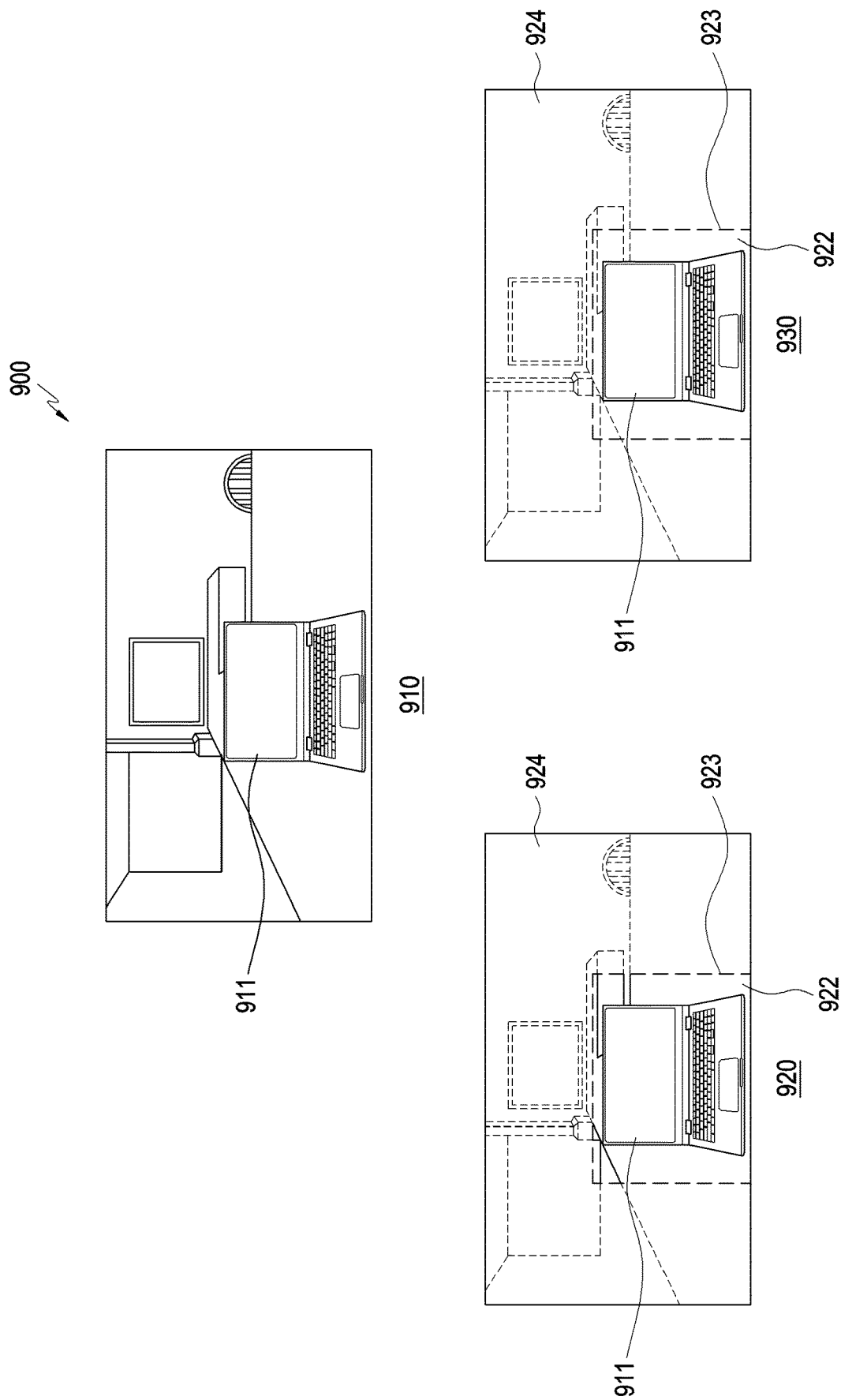
FIG. 9 is a diagram illustrating an example of a method for displaying a virtual image according to an embodiment of the disclosure.

FIG. 9 is a diagram 900 illustrating an example of a method for displaying a virtual image according to an embodiment of the disclosure.

Referring to FIG. 9, the processor 350 may determine a first area in which the at least one first object is seen (hereinafter, this is used together with a "first area"), and a second area in which the at least one second object is seen (hereinafter, this is used together with a "second area"), on the transparent members 290-1 and 290-2 by using a designated scheme. For example, the processor 350 may determine the first area on the transparent members 290-1 and 290-2, in which the at least one first object is seen, and the second area on the transparent members 290-1 and 290-2, in which the at least one second object is seen, based on the position of the at least one first object in an image part, and the position of the at least one second object in the image part, based on the information (e.g., an image relating to the multiple objects, obtained via a camera of the HMD device 200) relating to the surrounding environment of the HMD device 200. As another example, the processor 350 may determine the first area on the transparent members 290-1 and 290-2, in which the at least one first object is seen, and the second area on the transparent members 290-1 and 290-2, in which the at least one second object is seen, based on the direction of the HMD device 200 relative to the at least one first object and the at least one second object (e.g., the direction opposite to the direction in which the transparent members 290-1 and 290-2 of the HMD device 200 face a user, and/or the direction of a camera included in the HMD device 200) (and/or a user's gaze), and based on the distances between the HMD device 200 and the at least one first object and the at least one second object. A method for determining, by the processor 350, the first area on the transparent members 290-1 and 290-2, in which the at least one first object is seen, and the second area on the transparent members 290-1 and 290-2, in which the at least one second object is seen, is not limited to the above examples.

The processor 350 may display, via the display 330, a virtual image preventing the at least one second object positioned outside the focus space from being clearly seen in an area of the transparent members 290-1 and 290-2, in which the at least one second object is seen. For example, the processor 350 may display, via the display 330, a virtual image in an area of the transparent members 290-1 and 290-2, in which the at least one second object is seen, so that the at least one second object is opaquely (or semi-transparently) seen. As another example, the processor 350 may display, via the display 330, a virtual image in an area of the transparent members 290-1 and 290-2, in which the at least one second object is seen, so that the at least one second object is seen to be blurred, dark, or be in a mosaic type. A method for displaying a virtual image preventing the at least one second object from being clearly seen is not limited to the above examples. For example, the processor 350 may display, via the display 330, various types of virtual images (e.g., a still image or a dynamic image) (a two-dimensional image or a three-dimensional image), such as a curtain or a waterfall, in the second area of the transparent member, in which the at least one second object is seen, so as to prevent the at least one second object from being clearly seen.

The processor 350 may display, via the display 330, a virtual image having the same size (e.g., area) as the size (e.g., area) of the second area at the position of the second area of the transparent members 290-1 and 290-2, in which the at least one second object is seen.

With respect to the at least one third object positioned on the at least one boundary surface setting the focus space, the processor 350 may display a virtual image in an area of the transparent members 290-1 and 290-2, in which a part of the at least one third object, which is positioned outside the focus space, is seen, and may not display a virtual image in an area of the transparent members 290-1 and 290-2, in which a part of the at least one third object, which is positioned inside the focus space, is seen.

The processor 350 may not display, via the display 330, a virtual image in the first area of the transparent member, in which the at least one first object is seen, so that the at least one first object positioned inside the focus space is seen to be clear (e.g., transparent or not blurred).

Reference numeral 910 in FIG. 9 may indicate a surrounding environment (e.g., multiple objects included in the surrounding environment) of the HMD device 200, which is seen through the transparent members 290-1 and 290-2 in a case where the focus function is not executed. As in the illustration indicated by reference numeral 910 in FIG. 9, in a case where the focus function is not executed, multiple objects (e.g., multiple things or multiple articles) including a designated object 911 (e.g., a notebook) may be clearly (e.g., transparently) seen to a user through the transparent members.

Reference numeral 920 in FIG. 9 may indicate a surrounding environment of the HMD device 200, which is seen through the transparent members 290-1 and 290-2 in a case where the focus function is executed. In the illustration indicated by reference numeral 920, the processor 350 may not display, via the display 330, a virtual image for a first area 922 in which at least one first object (e.g., the inside of the focus space) included in the focus space is seen. In the illustration indicated by reference numeral 920, the processor 350 may display, via the display 330, a virtual image for a second area 924 in which at least one second object (e.g., the outside of the focus space) included outside the focus space is seen, so as to prevent the at least one second object from being clearly seen. In the illustration indicated by reference numeral 920 (and reference numeral 930), reference numeral 923 may indicate a boundary line between the inside and the outside of the focus space.

The processor 350 may display, via the display 330, a virtual image for a fourth area remaining after excluding a third area in which a designated object (e.g., a designated object used to set the focus space) positioned in the focus space is seen (hereinafter, a "third area") (hereinafter, a "fourth area") on the transparent members 290-1 and 290-2. For example, the processor 350 may not display a virtual image for the third area of the transparent member, in which a designated object (e.g., the designated object 523 in FIG. 5) positioned in the focus space and used to set the focus space is seen, so as to enable the designated object to be clearly seen. The processor 350 may display, via the display 330, a virtual image for the fourth area remaining after excluding the third area on the transparent members 290-1 and 290-2, so as to prevent the remaining objects (e.g., remaining things) except for the designated object from being clearly seen.

In the illustration indicated by reference numeral 930, in a case where the focus function is executed, the processor 350 may display a virtual image, via the display 330, for the fourth area (e.g., an area including the second area 924 and the area remaining after excluding the third area from the first area 922) remaining after excluding the third area in which the designated object 911 is seen. For example, the processor 350 may perform image processing (e.g., edge detection) of the first area 922, and may display a virtual image for the second area 924 and the fourth area remaining after excluding the designated object 911.

In the above example, the processor 350 displays a virtual image for the fourth area remaining after excluding the third area in which a designated object positioned in the focus space is seen. However, the disclosure is not limited thereto. For example, the processor 350 may display, via the display 330, a virtual image for an area remaining after excluding an area of the transparent member 290-1 and 290-2, in which at least one object selected by a user's input is seen among the at least one first object positioned in the focus space.

Based on a user input, the processor 350 may display a virtual image for the second area in which the at least one second object included outside the focus space is seen, or may display a virtual image for the fourth area remaining after excluding the third area in which a designated object is seen. For example, based on a user input, the processor 350 may select a scheme of displaying a virtual image for the second area in which the at least one second object included outside the focus space is seen, or a scheme of displaying a virtual image for the fourth area remaining after excluding the third area in which a designated object is seen.

The processor 350 may display, via the display 330, a virtual object for providing information relating to the at least one first object (or a designated object) in the first area (or the third area in which the designated object is seen) in which the at least one first object is seen. The processor 350 may not display, via the display 330, a virtual object for providing information relating to an object in the second area or the fourth area on which a virtual image is displayed.

The processor 350 may display a virtual object in the third area in which a designated object is seen. For example, the processor 350 may display a virtual object for providing information to a user in the third area in which a designated object is seen, and may display a virtual image having the same size as the size of the area remaining after excluding the third area, so that the area remaining after excluding the third area is seen to be opaque or blurred.

The processor 350 may display, via the display 330, a virtual image in an area (and/or a user's gaze range) corresponding to the FOV of the HMD device 200 within the entire area of the transparent members 290-1 and 290-2. For example, the processor 350 may identify, via the sensor 320, an area (e.g., an area in which an object (e.g., a thing or article) within the FOV of the HMD device 200 is seen) corresponding to the FOV of the HMD device 200 within the entire area of the transparent members 290-1 and 290-2. The processor 350 may display, via the display 330, a virtual image in the second area or the fourth area included in the area corresponding to the FOV of the HMD device 200.

Although not illustrated in FIG. 4, the processor 350 may change (or update) displaying of a virtual image, based on a movement of the HMD device 200 while the focus function is being executed. For example, the processor 350 may detect a movement (e.g., the traveling and/or the rotation of the HMD device 200) of the HMD device 200 via the sensor 230 (e.g., an acceleration sensor) while the focus function is being executed. The processor 350 may newly obtain (or update) information relating to the surrounding environment according to the movement of the HMD device 200. The processor 350 may change (or maintain) the set focus space according to the movement of the HMD device 200. The processor 350 may change (or update) displaying of a virtual image by performing operations 405 and 407, based on the newly obtained (or updated) information relating to the surrounding environment and/or the changed (or maintained) focus space.

The examples of FIG. 4 to FIG. 9 provide a method for executing the focus function by the HMD device 200 having a see-through type, but the disclosure is not limited thereto. According to an embodiment of the disclosure, even in a case where the HMD device 200 is implemented as the HMD device 200 having a see-closed type, at least some of the above examples may be applied in the same or similar way. For example, the processor 350 may process a part of the at least one second object positioned outside the focus space, to be opaque (or blurred) in an image obtained via a camera, and may not process a part of the at least one first object positioned in the focus space. The processor 350 may display, via the display 330, an image including a part of the at least one second object, which has been opaquely processed.

Figure 10:
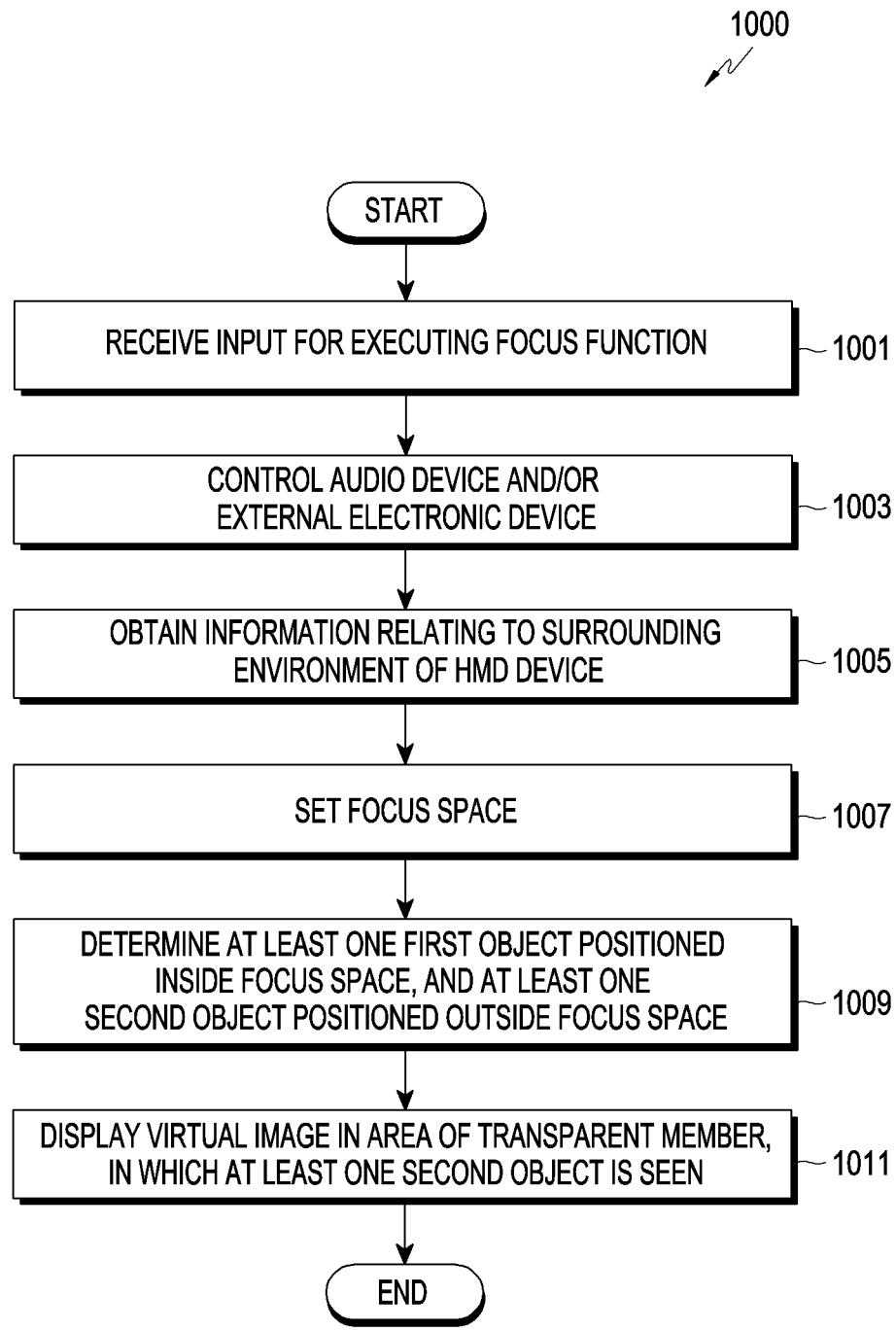
FIG. 10 is a flowchart illustrating a method for providing an augmented reality image according to an embodiment of the disclosure.

FIG. 10 is a flowchart 1000 illustrating a method for providing an augmented reality image according to an embodiment of the disclosure.

Referring to FIG. 10, in operation 1001, the processor 350 may receive an input for executing a focus function.

The input for executing the focus function may be an input indicating that the HMD device 200 is worn by a user. The input for executing the focus function may be a designated user input (e.g., a touch input on a touch pad, a user's hand gesture, a movement of the HMD device 200, a user's voice input, or execution of a designated application). The input for executing the focus function may be an input indicating that the location of the HMD device 200 corresponds to a designated location. The input for executing the focus function is not limited to the above examples.

The processor 350 may execute the focus function, based on the reception of the input for executing the focus function.

In operation 1003, the processor 350 may control an audio device (e.g., a microphone and/or a speaker) included in the HMD device 200, and/or an external electronic device.

In a case where the focus function is executed, the processor 350 may perform a function for removing a noise included in a sound introduced to a microphone included in the HMD device 200 from the external environment. For example, in a case where the focus function is executed, the processor 350 may activate a noise canceling function (e.g., active noise cancellation (ANC) function) of the microphone.

In a case where the focus function is executed, the processor 350 may output, via a speaker, a designated noise enabling improvement of a user's concentration. For example, in a case where the focus function is executed, the processor 350 may output, via the speaker, white noise, pink noise, and/or brown noise.

In a case where the focus function is executed, the processor 350 may output, via a speaker, a sound source and/or a sound effect set by a user to be output at the time of execution of the focus function.

In a case where the focus function is executed, when a sound is being output via a speaker, the processor 350 may output, via a speaker, a sound source and/or a sound effect set by a user to be output at the time of execution of the focus function, or a noise (e.g., white noise, pink noise, or brown noise) in replacement of or in addition to the sound being output.

In a case where the focus function is executed, the processor 350 may control multiple microphones included in the HMD device 200 to operate as directional microphones, so as to recognize sounds generated in the first area or the third area, and provide a result based on the recognized sounds to a user.

In a case where the focus function is executed, when an event related to a notification, an alarm, and/or call reception occurs, the processor 350 may control a speaker to prevent a sound set to be output at the time of occurrence of the event from being output.

In a case where the focus function is executed, the processor 350 may control an external electronic device (e.g., IoT device) registered in a server (e.g., an Internet of things (IoT) server) by using a user's account of the HMD device 200 and/or an external electronic device connected to the HMD device 200 by communication.

In a case where the focus function is executed, the processor 350 may transmit, via the communication module 310, a control signal to an earphone (e.g., true wireless stereo (TWS) earphone) connected to the HMD device 200 by communication, so as to allow the earphone connected to the HMD device 200 by communication to execute a noise canceling function.

In a case where the focus function is executed, the processor 350 may transmit, via the communication module 310, a control signal to an external electronic device connected to the HMD device 200 by communication so that a configuration (e.g., display color, brightness, definition, and/or a configuration of a display mode) a display of the external electronic device connected to the HMD device 200 by communication is set to have a designated configuration (e.g., a configuration set by a user).

In a case where the focus function is executed, the processor 350 may search for, via the communication module 310, an external electronic device positioned around the HMD device 200, and establish communication for controlling the external electronic device. For example, the processor 350 may transmit a control signal for requesting to perform a function corresponding to the focus function, based on a function which can be provided by the external electronic device positioned around the HMD device 200.

In a case where the focus function is executed, the processor 350 may control an external electronic device registered in a server by using a user's account of the HMD device 200. For example, in a case where the focus function is executed, the processor 350 may control, via the server, a lighting device registered in the server by using the user's account of the HMD device 200 so that the lighting device outputs a designated brightness of light. As another example, in a case where the focus function is executed, the processor 350 may control, via the server, a speaker device registered in the server by using the user's account of the HMD device 200 so that the speaker device does not output a sound or outputs a designated noise. A method for controlling, by the processor 350, an external electronic device at the time of execution of a focus mode is not limited to the above examples.

In operation 1005, in a case where the focus function is executed (e.g., the HMD device 200 has entered a focus mode), the processor 350 may obtain information relating to a surrounding environment of the HMD device 200.

In operation 1007, the processor 350 may set a focus space generated based on a designated location.

In operation 1009, the processor 350 may determine, based on the information relating to the surrounding environment and the focus space, at least one first object positioned inside the focus space, and at least one second object positioned outside the focus space.

In operation 1011, the processor 350 may display, via the display 330, a virtual image in an area of a transparent member, in which the at least one second object is seen.

Examples for operation 1005 to operation 1011 are at least partially identical or similar to the examples for operation 401 to operation 407 of FIG. 4, and thus a detailed description thereof will be omitted.

The processor 350 may terminate the focus function, based on a designated input. For example, the processor 350 may terminate the focus function, based on a user input for terminating the focus function. As another example, the processor 350 may terminate the focus function when the location of the HMD device 200 is far a designated distance away from a location designated to execute the focus function. As another example, the processor 350 may terminate the focus function when an urgent message is received via the communication module 310, or when a dangerous situation is sensed. As another example, the processor 350 may terminate the focus function when it is detected that the HMD device 200 is taken off from a user. As another example, the processor 350 may terminate the focus function, based on an input to turn off the power of the HMD device 200. As another example, the processor 350 may terminate the focus function, based on termination of an application using the focus function. The input for terminating the focus function is not limited to the above examples.

In a case where the focus function is terminated, the processor 350 may control an audio device (e.g., a microphone and/or a speaker) included in the HMD device 200, and/or an external electronic device. For example, in a case where the focus function is terminated, the processor 350 may deactivate a noise canceling function of a microphone. As another example, in a case where the focus function is terminated, the processor 350 may control a speaker not to output a designated noise, and/or a sound source and/or a sound effect set by a user to be output at the time of execution of the focus function. As another example, in a case where the focus function is terminated, when an event related to a notification, an alarm, and/or call reception occurs, the processor 350 may control a speaker to output a sound set to be output at the time of occurrence of the event. As another example, in a case where the focus function is terminated, the processor 350 may control, via the communication module 310, an external electronic device (e.g., an external electronic device connected to the HMD device 200 by communication, and/or an external electronic device registered in a server by using a user's account of the HMD device 200) such that the external electronic device operates according to a setting before execution of the focus function.

Figure 11:
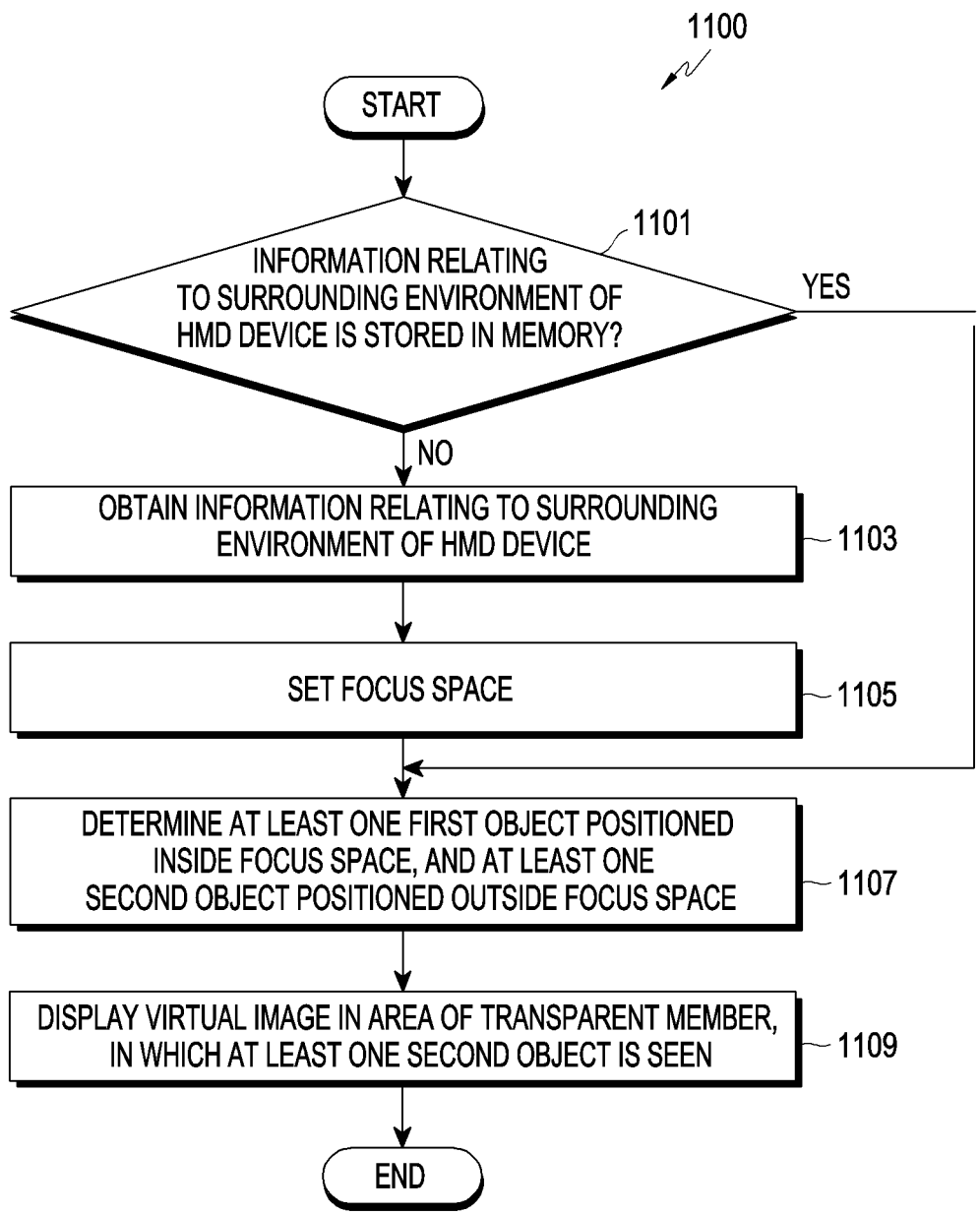
FIG. 11 is a flowchart illustrating a method for providing an augmented reality image according to an embodiment of the disclosure.

FIG. 11 is a flowchart 1100 illustrating a method for providing an augmented reality image according to an embodiment of the disclosure.

Referring to FIG. 11, in operation 1101, the processor 350 may identify whether information relating to a surrounding environment of the HMD device 200 is stored in the memory 340.

The processor 350 may determine the location (e.g., the current location of the HMD device 200) of the HMD device 200. For example, the processor 350 may determine the location of the HMD device 200 via the communication module 310 (e.g., a GNSS communication module, a GPS communication module, and/or a UWB communication module). As yet another example, the processor 350 may determine the location of the HMD device 200, based on information received from multiple external electronic devices connected to the HMD device 200 by communication. The processor 350 may receive, from three or more external electronic devices, information relating to the locations of the three or more external electronic devices via the communication module 310 (e.g., a short-range communication module). The processor 350 may calculate the distances between the HMD device 200 and the three or more external electronic devices by measuring the strengths of signals received from the three or more external electronic devices. The processor 350 may obtain (e.g., calculate) three-dimensional coordinates (e.g., latitude, longitude, and altitude) of the HMD device 200, based on the locations of the three or more external electronic devices, and the distances between the HMD device 200 and the three or more external electronic devices. The operation of obtaining, by the processor 350, the three-dimensional coordinates of the HMD device 200, based on the information received from the three or more external electronic devices may be an operation of determining the location of the HMD device 200 by using a triangulation method. As yet another example, the processor 350 may determine the location of the HMD device 200 by combining the location of the HMD device 200, which is determined via the communication module 310 (e.g., a GNSS communication module communication, a GPS communication module, or UWB communication module), and/or the location of the HMD device 200, which is determined by using a triangulation method.

The processor 350 may identify whether information relating to a surrounding environment corresponding to the location of the HMD device 200 is stored in the memory 340.

In a case where a focus function is executed, the processor 350 may store information related to the focus function in the memory 340. In a case where the focus function is executed, the processor 350 may map, to the location of the HMD device 200, the focus function of which is executed, information relating to a focus space and/or information relating to the surrounding environment, which is obtained at the location of the HMD device 200, the focus function of which is executed, and may store the mapped information in the memory 340. In a case where a focus function is executed, the processor 350 may store, in the memory 340, biometric information of a user wearing the HMD device 200, the focus function of which is executed. For example, when a user performs the focus function, and sets information relating to a focus space, the processor 350 may store, in the memory 340, the user's biometric information and the information relating to the focus space.

The processor 350 may identify a location of the HMD device 200, which is stored in the memory 340 and corresponds to the current location (e.g., is the same as the current location) of the HMD device 200, and may identify information relating to a surrounding environment and/or information relating to a focus space, which is mapped to the identified location of the HMD device 200.

When it is identified that the information relating to the surrounding environment of the HMD device 200 is stored in the memory 340, the processor 350 may obtain the information relating to the surrounding environment of the HMD device 200 from the memory 340.

In the above examples, the processor 350 obtains the information relating to the surrounding environment of the HMD device 200 from the memory 340, but the disclosure is not limited thereto. According to an embodiment of the disclosure, the processor 350 may obtain the information relating to the surrounding environment of the HMD device 200 via the communication module 310 from an external electronic device (e.g., a server). For example, in a case when a user visits a particular place, the processor 350 may obtain the information relating to the surrounding environment of the HMD device 200 by receiving information relating to a surrounding environment, which is mapped to the location of the particular place, via the communication module 310 from an external electronic device disposed in the particular place.

In operation 1103, when it is identified in operation 1101 that the information relating to the surrounding environment of the HMD device 200 is not stored, the processor 350 may obtain the information relating to the surrounding environment of the HMD device 200.

The operation of obtaining the information relating to the surrounding environment of the HMD device 200 according to operation 1103 is at least partially identical or similar to an operation of obtaining information relating to a surrounding environment of the HMD device 200 according to operation 401 of FIG. 4. Therefore, a detailed description thereof will be omitted.

In operation 1105, the processor 350 may set a focus space generated based on a designated location.

The operation of setting a focus space generated based on a designated location according to operation 1105 is at least partially identical or similar to an operation of setting a focus space generated based on a designated location according to operation 403 of FIG. 4. Therefore, a detailed description thereof will be omitted.

In operation 1105, the processor 350 may determine, based on the information relating to the surrounding environment and the focus space, at least one first object positioned inside the focus space, and at least one second object positioned outside the focus space.

When it is identified in operation 1101 that the information relating to the surrounding environment of the HMD device 200 is stored in the memory 340, the processor 350 may determine, based on the information relating to the surrounding environment and information relating to the focus space, at least one first object positioned inside the focus space, and at least one second object positioned outside the focus space.

When it is identified in operation 1101 that the information relating to the surrounding environment of the HMD device 200 is not stored in the memory 340, the processor 350 may determine, based on the information relating to the surrounding environment, which is obtained in operation 1103, and the focus space, which is set in operation 1105, at least one first object positioned inside the focus space, and at least one second object positioned outside the focus space.

The operation of determining, by the processor 350 and based on the information relating to the surrounding environment and the focus space, at least one first object positioned inside the focus space, and at least one second object positioned outside the focus space according to operation 1107 is at least partially identical or similar to an operation of determining, by the processor 350 and based on the information relating to the surrounding environment and the focus space, at least one first object positioned inside the focus space, and at least one second object positioned outside the focus space according to operation 405 of FIG. 4. Therefore, a detailed description thereof will be omitted.

In operation 1109, the processor 350 may display, via the display 330, a virtual image in an area of a transparent member, in which the at least one second object is seen.

The operation of displaying, by the processor 350, a virtual image in an area of a transparent member, in which the at least one second object is seen, according to operation 1109 is at least partially identical or similar to an operation of displaying, by the processor 350, a virtual image in an area of a transparent member, in which the at least one second object is seen, according to operation 407 of FIG. 4. Therefore, a detailed description thereof will be omitted.

A method for providing an augmented reality image by an HMD device 200 according to various embodiments of the disclosure may include obtaining information on a surrounding environment of the HMD device 200 via at least one sensor 320 of the HMD device 200, setting a focus space generated based on a designated location, determining at least one first object positioned inside the focus space and at least one second object positioned outside the focus space, based on the information on the surrounding environment and the focus space, and displaying, via a display 330 of the HMD device 200, a virtual image in an area of transparent members 290-1 and 290-2, wherein the at least one second object is seen in the area.

In various embodiments, the designated location may include a location of the HMD device 200 or a location designated based on a user input.

In various embodiments, the setting of the focus space may include setting the focus space generated within a designated distance from the designated location.

In various embodiments, the setting of the focus space may include setting the focus space, based on a distance between the designated location and a location of a designated object, with respect to the designated location.

In various embodiments, the setting of the focus space may further include enlarging or reducing the focus space, based on a designated input.

In various embodiment, the enlarging or reducing of the focus space may include setting, based on an input to select an object included in the surrounding environment, the focus space including a location of the selected object.

In various embodiments, the displaying of the virtual image may include displaying, via the display 330, the virtual image having a size identical to a size of the area in the area of the transparent members 290-1 and 290-2 so that the at least one second object is seen to be opaque or blurred.

In various embodiments, the displaying of the virtual image may include, based on the focus space being set based on a distance between the designated location and a location of a designated object, displaying, via the display 330, the virtual image in a remaining area other than an area in which the designated object is seen on the transparent members 290-1 and 290-2.

In various embodiments, the method may further include identifying whether the information on the surrounding environment of the HMD device 200 is stored in a memory of the HMD device 200, and when the information on the surrounding environment of the HMD device 200 is stored in the memory, obtaining the information on the surrounding environment of the HMD device 200 from the memory.

In various embodiments, the method may further include, based on a focus function for displaying the virtual image being executed, controlling an audio device of the HMD device 200 and/or an external electronic device such that the audio device and/or the external electronic device operates according to a setting related to the focus function.

In addition, a data structure used in an embodiment of the disclosure may be recorded on a computer-readable recording medium through various means. The computer-readable recording medium may include a storage medium, such as a magnetic storage medium (e.g., a ROM, a floppy disc, or a hard disc) or an optical reading medium (e.g., a CD-ROM or a digital video disc (DVD)).

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A head-mounted display (HMD) device comprising:
a transparent member;
a display;
at least one sensor; and
at least one processor functionally connected to the display and the at least one sensor,
wherein the at least one processor is configured to:
  obtain information on a surrounding environment of the HMD device via the at least one sensor,
  set a focus space generated based on a designated location,
  based on the information on the surrounding environment and the focus space, determine at least one first object positioned inside the focus space, and at least one second object positioned outside the focus space, and
  display, via the display, a virtual image in a first area of the transparent member, the at least one second object being seen in the first area, the virtual image having a size identical to a size of the first area such that the at least one second object is seen to be opaque or blurred and the at least one first object is seen to be transparent,
wherein the at least one processor is configured to:
  set, as the focus space, a three-dimensional reality space determined based on a distance between a current location of the HMD device and a location of a designated object selected by a user input with respect to the current location of the HMD device, and
wherein the at least one first object, the at least one second object, and the designated object are real objects.

2. The HMD device of claim 1, wherein the at least one processor is further configured to set the focus space generated within a designated distance from the designated location.

3. The HMD device of claim 1, wherein the at least one processor is further configured to enlarge or reduce the focus space, based on a designated input.

4. The HMD device of claim 3, wherein the at least one processor is configured to, based on an input to select an object included in the surrounding environment, set the focus space including a location of the selected object.

5. The HMD device of claim 1, wherein the at least one processor is further configured to, based on the focus space being set based on a distance between the designated location and a location of a designated object, display, via the display, the virtual image in a remaining area other than an area in which the designated object is seen on the transparent member.

6. The HMD device of claim 1, wherein the at least one processor is further configured to:
identify whether the information on the surrounding environment of the HMD device is stored in a memory of the HMD device; and
when the information on the surrounding environment of the HMD device is stored in the memory, obtain the information on the surrounding environment of the HMD device from the memory.

7. The HMD device of claim 1, further comprising:
an audio device,
wherein the at least one processor is further configured to, based on a focus function for displaying the virtual image being executed, control the audio device and/or an external electronic device such that the audio device and/or the external electronic device operates according to a setting related to the focus function.

8. A method for providing an augmented reality image by an HMD device, the method comprising:
obtaining information on a surrounding environment of the HMD device via at least one sensor of the HMD device;
setting a focus space generated based on a designated location;
based on the information on the surrounding environment and the focus space, determining at least one first object positioned inside the focus space, and at least one second object positioned outside the focus space; and
displaying, via a display of the HMD device, a virtual image in a first area of a transparent member of the HMD device, the at least one second object being seen in the first area, the virtual image having a size identical to a size of the first area such that the at least one second object is seen to be opaque or blurred and the at least one first object is seen to be transparent, wherein the setting of the focus space comprises:

setting, as the focus space, a three-dimensional reality space determined based on a distance between a current location of the HMD device and a location of a designated object selected by a user input with respect to the current location of the HMD device, and wherein the at least one first object, the at least one second object, and the designated object are real objects.

9. The method of claim 8, wherein the setting of the focus space further comprises setting the focus space generated within a designated distance from the designated location.

10. The method of claim 8, wherein the setting of the focus space further comprises enlarging or reducing the focus space, based on a designated input.

11. The method of claim 10, wherein the enlarging or reducing of the focus space comprises setting, based on an input to select an object included in the surrounding environment, the focus space including a location of the selected object.

12. The method of claim 8, wherein the displaying of the virtual image further comprises, based on the focus space being set based on a distance between the designated location and a location of a designated object, displaying, via the display, the virtual image in a remaining area other than an area in which the designated object is seen on the transparent member.

13. The method of claim 8, further comprising:

identifying whether the information on the surrounding environment of the HMD device is stored in a memory of the HMD device; and when the information on the surrounding environment of the HMD device is stored in the memory, obtaining the information on the surrounding environment of the HMD device from the memory.

14. The method of claim 8, further comprising, based on a focus function for displaying the virtual image being executed, controlling an audio device of the HMD device and/or an external electronic device such that the audio device and/or the external electronic device operates according to a setting related to the focus function.

* * * * *